US011308247B2

(12) United States Patent
McDade

(10) Patent No.: US 11,308,247 B2
(45) Date of Patent: Apr. 19, 2022

(54) BUILDING QUALITY INDEXING SYSTEM

(71) Applicant: Archneura Inc., McLean, VA (US)

(72) Inventor: Clair Marie McDade, McLean, VA (US)

(73) Assignee: Archneura Inc., McLean, VA (US)

(*) Notice: Subject to any disclaimer, the term of this patent is extended or adjusted under 35 U.S.C. 154(b) by 0 days.

(21) Appl. No.: 17/331,512

(22) Filed: May 26, 2021

(65) Prior Publication Data

US 2021/0374297 A1    Dec. 2, 2021

Related U.S. Application Data

(60) Provisional application No. 63/030,179, filed on May 26, 2020.

(51) Int. Cl.
*G06F 30/13* (2020.01)
*G06Q 30/02* (2012.01)
*G06Q 10/00* (2012.01)
*G06F 119/02* (2020.01)

(52) U.S. Cl.
CPC ............ *G06F 30/13* (2020.01); *G06Q 10/20* (2013.01); *G06Q 30/0283* (2013.01); *G06F 2119/02* (2020.01)

(58) Field of Classification Search
CPC ...... G06F 30/13; G06F 30/00; G06F 2119/02; G06Q 10/20; G06Q 30/0283
USPC .......................................................... 703/6
See application file for complete search history.

(56) References Cited

U.S. PATENT DOCUMENTS

| 2010/0283606 | A1 | 11/2010 | Tsypin et al. |
| 2016/0117785 | A1 | 4/2016 | Lerick et al. |
| 2017/0098054 | A1 | 4/2017 | Hayward |
| 2019/0172163 | A1 | 6/2019 | Lerick et al. |
| 2019/0213766 | A1 | 7/2019 | Dozier |
| 2020/0057827 | A1 | 2/2020 | Eckenrode et al. |
| 2020/0090289 | A1* | 3/2020 | Elbsat ................. G06Q 50/163 |

OTHER PUBLICATIONS

Masciotta et al., "Development of Key Performance Indicators for the Structural Assessment of Heritage Buildings", Jul. 10, 2016, ResearchGate. (Year: 2016).*

(Continued)

*Primary Examiner* — Cedric Johnson
(74) *Attorney, Agent, or Firm* — Polsinelli LLP

(57) ABSTRACT

The present disclosure is directed to methods and apparatus for improving existing buildings or for improving new buildings. This process may include identifying factors and related metrics that leverage one or more building quality index values when an overall quality of a building is accessed and improved. Such a building quality index value may be a single value within a possible range of values. The index value may be a compilation or other transformation of values associated with various categories that may include building materials, types of businesses contained within the building, environmental impact of the building, and other metrics. This building quality index value may be a function of characteristics that may be associated with people that use the building, environmental conditions that surround the building, a location, a risk likelihood, past and future projected climatic conditions, or other factors.

21 Claims, 9 Drawing Sheets

(56) References Cited

OTHER PUBLICATIONS

Janjua, Shahana Y. et al., "Development of Triple Bottom Line Indicators for Life Cycle Sustainability Assessment of Residential Buildings", Apr. 1, 2020, Elsevier Ltd. (Year: 2020).*
PCT Application No. PCT/US2021/034347 International Search Report and Written Opinion dated Aug. 25, 2021.

* cited by examiner

BUILDING QUALITY INDEXING SYSTEM

CROSS-REFERENCE TO RELATED APPLICATIONS

This application claims priority benefit of U.S. provisional patent application 63/030,179 filed on May 26, 2020, the disclosure of which is incorporated herein by reference.

BACKGROUND OF THE INVENTION

Field of the Invention

The present disclosure relates to improving structures. More specifically, the present disclosure is directed to identifying ways in which particular buildings or building designs may be evaluated, analyzed, or improved.

Description of the Related Art

Buildings are often custom-built for a particular purpose or to fit the space designated at the construction site, resulting in a wide range in building quality. While various regulations and guidelines exist for building construction, these often only take into account the building materials, size constraints, etc. Current systems lack a scientifically accurate scale to enable statistical comparison of buildings and incentivize higher building quality.

It is a goal of the building designer to ultimately design a structure that is used for generations while improving the environment within and around the structure. Currently available metrics used by the architecture and real estate professions to evaluate building quality do not support the goal of making high quality, long lasting buildings. Building quality has been decreasing over time in order to deliver buildings to the market with a lower initial cost. However, these low-quality buildings require more repair and reinvestment, which is frequently neglected. In the short-term, low quality construction results in higher operational costs, vacancies, lower rents, poor occupant health, safety issues, lawsuits, and vulnerability to environmental events. In the long term, poor building quality results in premature demolition and landfill waste.

Demolition accounts for 90% of construction waste according to the US EPA, which contributes to greenhouse gases and depletion of natural resources. In addition to adverse environmental impact, low building quality also causes economic harm to owners as well as the economy at large. When a building is demolished, the owner can no longer receive any return on their investment. Commercial real estate is a major contributor to the GDP, contributing 1.01 trillion in 2018 ("Economic Impacts of Commercial Real Estate, 2020 US Edition," NAIOP Research Foundation). Moving the needle by extending the average building lifespan by a mere 10-20% would have a massive environmental and financial impact.

Building codes, while their stringency has been increasing over time, serve as a lowest common denominator establishing only minimum requirements for performance. Other available green-building rating systems such as LEED and BREEAM measure environmental performance only, neglecting to evaluate base building quality. In the architectural industry, base building is defined as the major systems composing the building, including at a minimum the foundation, structure, exterior envelope, roofing, mechanical, electrical, plumbing, and fire protection systems. There are two other major problems with current green building rating systems. First, the calculations of the systems are publicly disclosed, leading to cheating. This is akin to a standardized test where the answers are published. Secondly, the systems are costly, leading to very slow market adoption. LEED achieved only 4.7% of office building market share after 18 years of use (2017, National Green Building Adoption Index.) The Design Quality Indicator, developed by the Construction Industry Council in the United Kingdom, is a data driven system which measures primarily architectural features as a type of third-party design review before construction. The review process is time consuming and requires accredited facilitators, which make the system infeasible for mass adoption.

The real estate industry uses several general systems to evaluate buildings, which suffer from similar challenges. Either they are not quantitative, not precise enough, or vary across geographic regions. The Co-Star Building Rating System is a simple 1-5 star scale and is based on a qualitative listing of features. Office Classes (A, B, C etc.) are similarly qualitative, based on subjective judgement and can vary from city to city. For these reasons, the industry has failed to systematically measure or improve the quality of buildings over time.

To create an effective system that overcomes these flaws, the Building Quality Index (BQI) is designed as a framework by which the exact calculations can be unknown to users, like a hidden key. In addition, it involves economic calculations to quantitatively justify quality improvement by reducing the total cost of the building throughout its lifespan, when construction, operational, and disposal costs are taken into account. This provides an economic justification for increasing quality, both environmental performance and base-building quality, creating a firm foundation for broad market adoption.

Economics exerts additional influence on building quality in other ways. Building quality has been decreasing over time in order to deliver buildings to the market with a lower initial cost. Developers desire lower cost buildings to make it easier to get commercial loans, and to protect their profit margins. However, these low-quality buildings require more repair and reinvestment, which is frequently neglected. In the short-term, low quality construction results in higher operational costs, vacancies, lower rents, poor occupant health, safety issues, lawsuits, and vulnerability to environmental events. In the long term, poor building quality results in premature demolition and landfill waste. Demolition accounts for 90% of construction waste according to the US EPA, which contributes to greenhouse gases and depletion of natural resources. The graph below, from the EPA "Advancing Sustainable Materials Management: 2018 Fact Sheet" shows a breakdown of construction waste into different categories. Orange represents demolition as a part of all construction waste.

In addition to adverse environmental impact, low building quality also causes economic harm to owners as well as the economy at large. The more frequently buildings are demolished, the more waste goes into landfills and the more money has to be reinvested to replace the buildings. When a building is demolished, the owner can no longer receive any return on their investment. Commercial real estate is a major contributor to the GDP, contributing 1.01 trillion in 2018 ("Economic Impacts of Commercial Real Estate, 2020 US Edition," NAIOP Research Foundation).

The lifespan of buildings has been getting shorter over time. A hundred years ago, the lifespan of an average building was about 100 years. Most new buildings today are demolished in 30-50 years. As every demolished building has embodied carbon in its materials, when these are disposed of, it contributes to the release of greenhouse gases, as well as reducing supply of non-renewable resources, contributing to air pollution, and contributing to adverse health impacts through particulate matter and other material released during demolition. Moving the needle by extending the average building lifespan by a mere 10-20% would have a massive environmental and financial impact.

The key to changing the trend of disposable buildings is to lengthen building lifespan. There is a tipping point where the cost of improvements to a building exceeds the cost to build new. When this tipping point is reached, demolition is almost always the result. If quality improvements are planned out over time and executed according to specific priorities, this tipping point can be prevented or extended, lengthening the lifespan of the building. However, the tipping point is reached at a 30-50 year lifespan for most buildings today. This is occurring because the industry currently does not systematically track quality or costs over the lifespan of the building. To extend lifespan, quality must be improved, or the building will not command the rents needed in the marketplace to support periodic capital reinvestment. The Building Quality Index (BQI) was created to enable building and industry-wide tracking of quality, lifespan, and cost, to stop the problem of disposable buildings.

What are needed are new methods and apparatus for quickly identifying how buildings may be improved in ways that make buildings more cost effective, less likely to be damaged by risks associated with a location where the buildings are located, and to make buildings have greater longevity.

SUMMARY OF THE PRESENTLY CLAIMED INVENTION

The presently claimed invention relates to a method and a non-transitory computer readable storage medium. In a first embodiment, a method may include receiving input data associated with a building, extracting quantitative data from the received input data, performing an analysis that compares the quantitative data with key performance indicator (KPI) data, and identifying results based on the analysis. This analysis may compare the quantitative data with the KPI data. The results of the analysis may include a recommendation of a physical improvement that could improve the building. This method may also include identifying costs associated with implementing the physical building improvement recommendation. This physical building improvement may then be performed based on the costs being associated with the implementation of the physical building improvement.

In a second embodiment a processor may execute instructions out of a memory to implement a method consistent with the present disclosure. Here again, the method may include receiving input data associated with a building, extracting quantitative data from the received input data, performing an analysis that compares the quantitative data with key performance indicator (KPI) data, and identifying results based on the analysis. Like mentioned above, this analysis may compare the quantitative data with the KPI data. The results of the analysis may include a recommendation of a physical improvement that could improve the building. In a next step, the method may also include identifying costs associated with implementing the physical building improvement recommendation. This physical building improvement may then be performed based on the costs being associated with the implementation of the physical building improvement.

BRIEF DESCRIPTIONS OF THE DRAWINGS

DETAILED DESCRIPTION

The present disclosure is directed to methods and apparatus for improving existing buildings or for improving new buildings. This process may include identifying factors and related metrics that leverage one or more building quality index values when an overall quality of a building is accessed and improved. Such a building quality index value may be a single value within a possible range of values, for example, a building may be assigned values one (1) to one thousand (1000). The index value may be a compilation or other transformation of values associated with various categories that may include building materials, structural systems, types of businesses or functional uses contained within the building, environmental impact of the building, and other metrics. This building quality index value may be a function of characteristics that may be associated with people that use the building, environmental conditions that surround the building, a location, a risk likelihood, past and future projected climatic conditions, or other factors. In one aspect, a plurality of categories may be associated with people, planet, profit, cost, and process. People refers to social characteristics about a building, such as historic status. Profit refers to the building's financial performance, such as whether it is cash flow negative, positive, and to what degree. Cost refers to the total cost of ownership, including construction cost, operational costs, and disposal costs. Process refers to best practices done by building professionals such as architects, engineers, contractors, property managers, and the like, for example, post-occupancy evaluations done by architects or continuous structural monitoring done by engineers. Metrics assigned to specific categories may vary based on a social value, a resource value, a fiscal value, or a practice value.

Figure 1:
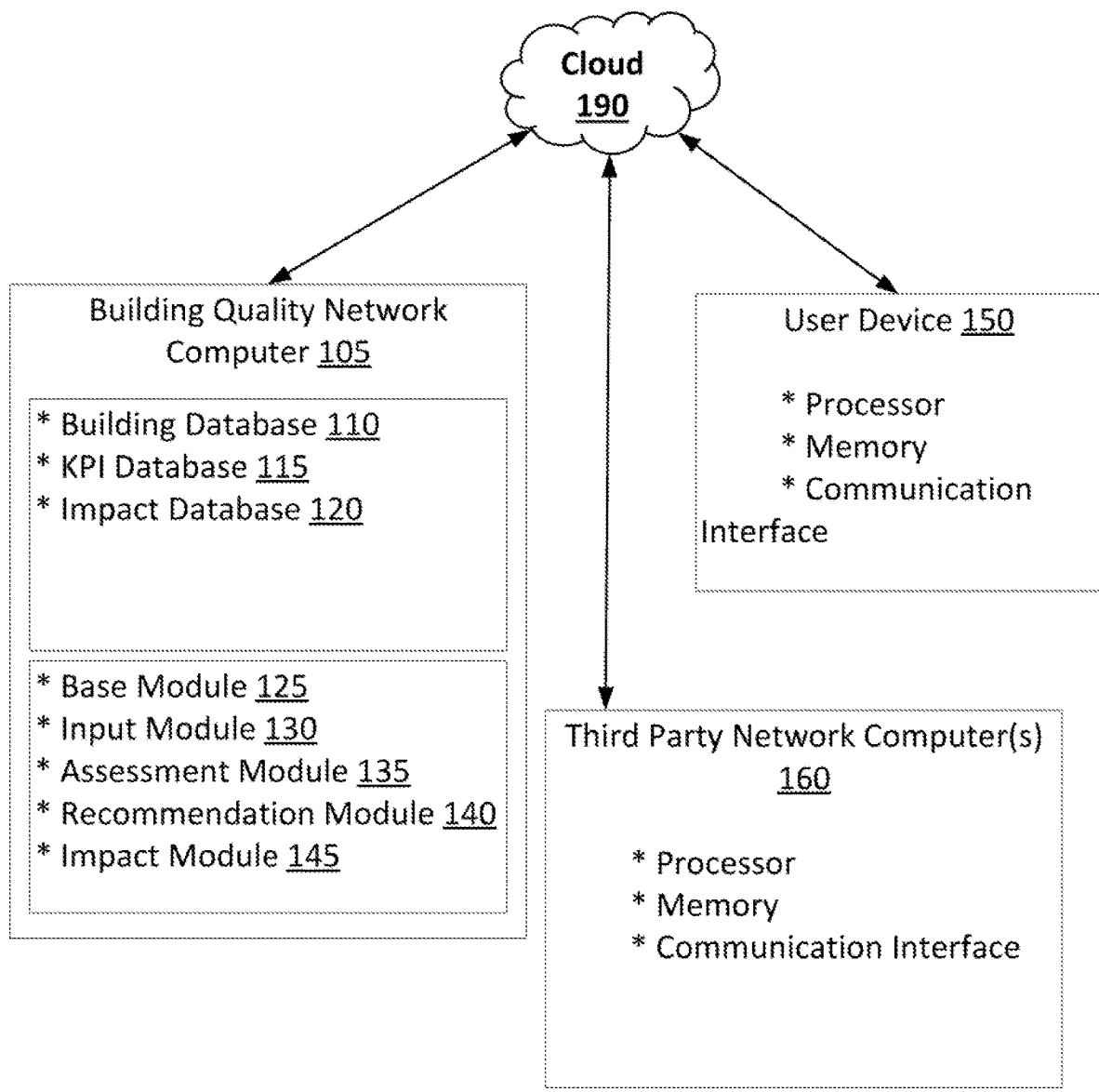
FIG. 1 illustrates computing devices that may communicate with each other when functions of a building quality indexing system are performed.

FIG. 1 illustrates computing devices that may communicate with each other when functions of a building quality indexing system are performed. FIG. 1 includes building quality network computer 105 that may communicate with user devices 150 and with third party network computers 160 via the cloud or Internet 190. The building quality network computer 105 that may perform analysis on one or more buildings to produce a building quality index score. The building quality index score value may be a single value within a possible range of values such as, for example, values 1-1000. In this example, a value of 1000 indicates a building having the highest possible values associated with data extracted from a set of source documents. As mentioned above, a quality index value may be a function of characteristics that may be associated with people that use the building, environmental conditions that surround the building, a location, a risk likelihood, past and future projected climatic conditions, or other factors.

The building quality network computer 105 of FIG. 1 includes a building database 110, a key performance indicator (KPI) database 115, and an impact database 120. While FIG. 1 illustrates three different databases, data associated with a building, key performance indicator data, and impact data may be stored at a single database that stores different types of data. Building quality network computer 105 may include a processor that executes instructions out of a memory. The instructions stored in the memory of the building quality network computer may be organized into any number of software modules even though FIG. 1 illustrates a base software module 125, an input software module 130, an assessment software module 135, a recommendation software module 140, and an impact software module 145. FIG. 1 also illustrates that user device 150 and third-party network computer 160 each have a respective processor, memory, and communication interface.

The building database 110 may store information related to characteristics of one or more buildings being evaluated by the building quality network computer 105 and buildings previously evaluated by the building quality network computer 105. Information stored at the building database 110 may include, yet is not limited to data associated with building materials, building permits, architectural drawings, specifications, geotechnical reports, capital improvement plans, pro forma, photos, operating budgets, as well as data points and building attributes that may be extracted from one or more inputs. This building data may also include cost estimates on potential capital improvements to some or all of a set of observed building characteristics. Some or all of the information stored at the building database 110 may be input by one or more users through a user interface and by execution of instructions of the input software module 130. Information stored at the building database 110 may also come from third parties such as contractors, designers, permit offices, utilities, as well as other building standards such as U.S. Green Building Council's Leadership in Energy and Environmental Design (LEED®), National Association of Home Builders' ICC 700 National Green Building Standard (NGBS), Energy Star, etc. The system value for any known building characteristics may be also stored at the building database 110.

The key performance indicator (KPI) database 115, may store the key performance indicator (KPI) data that may be used a processor of the building quality network computer 105 when instructions of the assessment software module 135 are executed to generate a building quality index score. Key performance indicators may be numeric metrics associated with observed building characteristics such as construction type, operational cost, natural disaster risk, safety equipment, energy efficiency, etc. A KPI may be an industry-standard such as the bearing pressure of soil, or it may be an evaluation made by an expert or administrator of the building quality network computer 105. In certain instances, particular KPIs and related values may be identified by a machine learning algorithm. A system value may be assigned to each building characteristic and each KPI stored at the building database 110. The value associated with each KPI, may be based on the units for a given building attribute, or may be scaled to a unitless system value. The impact of each system value on the overall building quality index score may be weighted. The weight of each system value may be determined by an administrator of the building quality network computer 105. The weight of each system value may also be determined by the processor of the building quality network computer 105 by executing instructions of the impact software module 145. Alternatively, or additionally system values weights may be identified by another type of algorithm, artificial intelligence, or machine learning. The weight of each system value may be expressed in terms of a multiplier that may be used to increase or decrease a given system value's impact on an overall building quality index score.

The impact database 120 may store the relationship data, which may contain the relationships calculated between each building attribute, and associated KPI, and the influence that input has on the risk related to that input. For example, impact database 120 may store values reflecting the impact of components of an electrical system on fire risk for a building. A jurisdiction may update the electrical portion of their building codes and require additional equipment and/or safety measures. Execution of instructions of the impact software module 145 may compare actual instances of issues such as fire that are related to the electrical systems of buildings that meet the new building codes or to buildings that did not upgrade their equipment to meet the new standard. Relationships between KPI associated values and actual risks may be calculated or estimated by execution of instructions of the impact software module 145. Relationships between KPI values and actual risks may be stored at the impact database 120.

The impact software module 145 may include instructions that result in the building quality network computer 105 receiving information related to building risk. This risk information may be received based on the execution of instructions of the input software module 130 or this risk information may have been received from a third party/third party computer 160. Examples of third parties include regulatory agencies, emergency services, contractors, flood maps, or application programs, etc. This risk data may include information associated with natural disasters such as floods, lightning strikes, and earthquakes. This risk data may also be associated with man-made issues such as fire, theft, hazardous materials, and vandalism, or may be associated with capital improvements and changes in operational costs. For example, large, unexpected costs caused by quality issues could be financially detrimental to the owner. Other examples of potential risks which may be evaluated include the ability of the building to function in a pandemic, security risks, and the building's ability to adapt to new technology over time. Execution of instructions of the impact software module 145 may identify a relationship between building characteristics, a KPI related to that building characteristic, the system value associated with the building characteristic, and a set of observed risk data. Relationships between building characteristics and observed risk may be used to assign weights to each system value when building quality index scores are calculated. Increases, or unexpected changes in a building's operating budget are a risk to building owners and are one way to measure risk. The observed risk may be measured in terms of the impact on the operational cost of a building and the lifespan of the building or components of the building. For example, the cost of replacing an HVAC system, repairing a cracked foundation, repairing damage from a burst pipe, fire, or natural disaster. The observed risk may be expressed in terms of cost to owners including changes to the ongoing operational costs of a building, such as energy and power usage, maintenance, and occupant wellbeing. Higher costs or unexpected costs are risks to an owner of a building. The observed risk may also include an analysis of the building's economic performance, looking at the operating income in relation to needed improvements. For example, a lower quality building may only be able to obtain lower rents in the marketplace, and operating income may not be enough to cover regular maintenance and periodic capital improvements. Over time, this situation will result in deferred maintenance and capital improvements, pushing the building closer to a tipping point where demolition becomes a viable economic option. Conversely, a higher quality building will be able to command higher rents in the marketplace and will have enough operating income to cover regular maintenance and periodic capital improvements. Therefore, a higher quality building is inherently lower risk; there is an inverse relationship between quality and risk.

Instructions of the impact software module 145 may calculate the relationship between each system value for each KPI and observed risk by comparing the cost of mitigating risk with the observed cost of the risk not being mitigated. The difference between these costs may be used as a weight for each system value in calculating a building quality index score. For example, if a building located in an area prone to earthquakes did not have seismic reinforcement, the impact module may look at the cost of doing those improvements and compare it to the potential loss that could occur if the building experienced a seismic event without this reinforcement. If there were a serious earthquake, this loss could be catastrophic such that the repair may cost more than the value of the building itself. Contrast seismic reinforcement to a roof leak, which may be repaired for a moderate sum. Damages from not repairing the leak, while they could be large if left unaddressed, would likely not be in the order of magnitude of the entire value of the building. Therefore, the lack of seismic reinforcement is a greater risk than a roof leak. This is quantified through cost analysis. The difference in these costs may be used as coefficients for each system value to relate them to the predicted value over time for a building through machine learning. This may be done with linear regression or polynomial regression, where a model is used to predict each risk on a set of buildings with applicable data inputs.

The execution of instructions of a building quality index (BQI) base module 125 may result in the processor of the building quality network computer 105 to initiate operations associated with the input software module 130, the assessment software module 135, and the recommendations software module 140 of FIG. 1. Instructions of the input software module 130 may be used to collect information about building characteristics and instructions of the assessment software module 135 may calculate a building quality index (BQI) value. Instructions of the recommendations software module 140 may identify and provide recommended improvements to a building, a building capital improvement plan, or an operating budget. Execution of the instructions of these various different software modules may be used to demonstrate that recommended potential improvements to the building would result in an improved building quality index score.

The initiation of instructions of the input software module 130 may be prompted by the execution of an instruction of the BQI base software module 125 when information about one or more building characteristics is available. A user may input primary source data from architectural drawings, specifications, geotechnical reports, capital improvement plans, operating budgets, photos. The relevant data from these materials may be identified by the input module 114 using an automated means, such as optical character recognition on a building permit or architectural drawing to identify the fire rating on an exterior wall. This information may be obtained directly from a third party, such as a permit office, building inspector, contractor, etc. Information about building characteristics may also be acquired through sensors. For example, a drone may be used to perform imaging of a building to identify leaks, cracks, or other damage to the building and efficiency measures such as radiant heat loss.

The execution of instructions of the assessment software module 135, may compare the building characteristics collected by the input module 114 to the system values for each KPI and the weight of the system value related to each building characteristic to create the building quality index score.

Instructions of the recommendations software module 140 may identify building characteristics that may be changed, such as capital improvements, maintenance, repairs, etc. These changes, capital improvements, maintenance, or repairs identified by the recommendations software module 140 may improve one or more system values of the building and these improved KPI values may result in an improved the building quality index score of the building by either improving the quality, durability, and expected life span of the building, or by reducing risks that may result in partial or complete reductions in building usability, value, and lifespan. The instructions of the recommendations software module 140 may result in the display of information that identifies a financial impact of a recommendation. This displayed information may include data that identifies the cost of a capital improvement, the cost of a potential risk that the capital improvement mitigates, a value that the capital improvement brings to the building, as well as the change a given recommendation may make on the building quality index score of the building.

As mentioned above the various computers illustrated in FIG. 1 above may communicate with each other via the cloud or Internet 190. These communications may be sent over any type of communication network known in the, wired, wireless, or combination thereof. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques are known in the art. The communication network may allow ubiquitous access to shared pools of configurable system resources and higher-level services that can be rapidly provisioned with minimal management effort, often over the internet, and relies on sharing of resources to achieve coherence and economies of scale, like a public utility. In contrast, third-party clouds allow organizations to focus on their core businesses instead of expending resources on computer infrastructure and maintenance. Cloud or Internet 190 may be communicatively coupled to building quality network computer 105, which may perform analysis on one or more buildings when communicating with one or more user devices 150 and with one or more third-party network computers 160. User devices 150 may be any type of computing device used in the art. For example, user devices 150 may be a computing device, laptop, smartphone, tablet, computer, smart speaker, or input/output (I/O) device.

The third-party network computer(s) 160 may provide information related to one or more characteristics of buildings being evaluated by the building quality network computer 105. Such third-party network computer(s) 160 may be associated with regulatory agencies, building permit offices, building inspector reports, emergency services, etc.

Table 1 includes exemplary data that may be stored at the impact database 120 of FIG. 1. The impact database 120 may store observed risk data and risk mitigation costs that may be used by execution of instructions of the impact software module 145 to determine which building characteristics have the largest impact on creating a building quality index score of a building. In certain instances, the net present value of risk associated with a given building characteristic may be observed in a sample of buildings. For example, one building characteristic may be related to the HVAC system in a building. There may be three types of HVAC systems available for a cohort of similar buildings. The cost of each type of HVAC system may be observed over time. This cost may include regular operating costs such as maintenance and energy use and costs associated with a failure. Costs associated with a failure in the system may include the cost of a new system, the installation of that system, and other potential impacts on the building's operating budget, such as lost rent. These costs may be observed by the building quality network computer 105, or it may come from one or more third-party network computers 160 that belong to contractors, cost estimators, etc. These observed costs may be converted to a net present value (NPV) to normalize the expenses over time with immediate or near-term mitigation costs. It should be obvious to one skilled in the art that while the risk is being measured by cost in this example, the risk may be measured in other ways, such as the impact of a building's characteristics on the lifespan of the building.

The impact database 120 may also store costs associated with mitigating some or all of the risk associated with given building characteristic. For example, a cohort of buildings may be similarly based on being built in a seismic zone and these buildings may not have the most up-to-date seismic mitigation measures. The observed risk associated with a seismic event in this group of buildings may be an average of ten million dollars ($10,000,000) as the data of table 1 shows. This risk value may be reflecting repair costs, lost operating revenue, demolition, lost capital, etc. For some building characteristics, the mitigation cost may have some or all of the NPV offset by savings or revenue. A high voltage air conditioning (HVAC) upgrade may offset some portion of its initial cost or deliver positive NPV, with a combination of energy savings, longer lifespan, lower maintenance cost, etc. For example, a new HVAC unit may cost $1,000,000. If this unit provided no value to the building over its life, the NPV of this would be negative $1,000,000. This negative NPV may be offset by $750,000 in energy savings resulting from the more efficient unit. The NPV of the upgrade may be further offset by $750,000 due to the unit having a 50% longer useful lifespan than the current unit. These two offsets may combine to result in a positive NPV of $500,000 for the HVAC upgrade. A portion of the NPV may be offset. For example, a new roof may cost $1,500,000, but the NPV may only be negative $1,000,000 due to $500,000 in reduced heating and cooling costs resulting from the improved insulation in the new roof.

TABLE 1

Impact Database Data

| KPI | Observed Risk NPV | Mitigation Cost NPV |
|---|---|---|
| HVAC | 1,000,000 | 500,000 |
| Seismic | 10,000,000 | 2,000,000 |
| Roof Type | 6,000,000 | 1,000,000 |

The data of table 1 identifies dollar amounts of risk costs and mitigation costs associated with key performance indicators (KPIs) relating to an HVAC system, seismic activity, and a type of roof. Note that risk costs associated with failure of an HVAC system are estimated at one million dollars, where a cost of mitigating that failure risk would cost five hundred thousand dollars. The data of table 1 also shows that risk costs associated with seismic activity are estimated at ten million dollars, where a cost of mitigating that risk is two million dollars. Table 1 also shows that a risk cost of a roof type of a building is estimated at six million dollars, where the cost of mitigating that roof type risk is one million dollars. The data of table 1 may have been generated by the building quality network computer 105 after receiving information from user device 150 and from third party network computer(s) 160.

Figure 2:
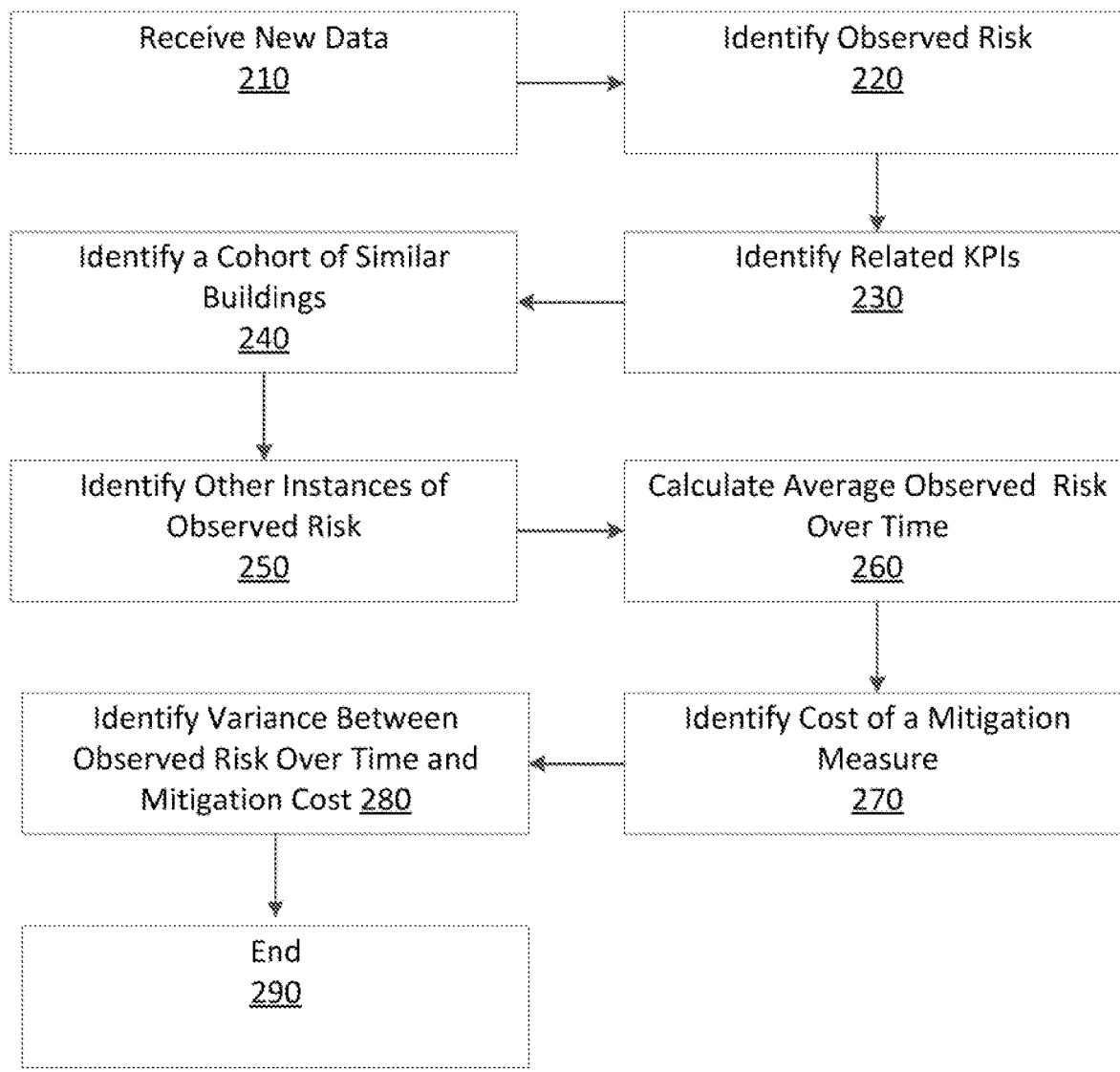
FIG. 2 illustrates steps that may be performed when a processor executes instructions to identify impacts associated with specific key performance indicators of a building.

FIG. 2 illustrates steps that may be performed when a processor executes instructions to identify impacts associated with specific key performance indicators of a building. The steps illustrated in FIG. 2 may be performed at the building quality network computer 105 of FIG. 1. The steps of FIG. 2 may be performed by according to instructions of the impact software module 145 of FIG. 1. FIG. 2 begins with step 210 where new data is received. This new data may be data related to either an observed risk or risk mitigation. The data received in step 210 from may come from various sources, such as building records, contractors, cost estimators, user input, user devices, or third-party network computers. This data may include repair or replacement costs, changes to operating budgets or building values, and any estimated changes, such as building lifespan. Next in step 220, an observed risk related to the new data may be identified. For example, the new data received in step 210 may identify a cost to repair damage to a building from a seismic event or changes to an operating budget due to lost rent from a roof leak. The building characteristic (e.g. seismic or roof) and an associated KPI, or characteristics and KPIs, related to the received data, may be identified at step 220 of FIG. 2.

After step 220, related KPIs are identified in step 230 and a cohort of buildings similar to the building related to the new data received may be identified at step 240 of FIG. 2. The impact database may be accessed in step 250 and data stored there may be filtered by the identified cohort of similar buildings so that other instances of a similar observed risk may be identified at step 250. The average risk over time for the identified building characteristic among the identified cohort of similar buildings may be calculated at step 260. This process may include identifying a cohort of ten buildings of similar size and construction that are all in a same seismic zone and that have each experienced two seismic events in a given time period that resulted in $120,000,000 in repairs, lost revenue, demolition, lost value, etc. That would yield an average risk of $12,000,000 for the building characteristic related to seismic mitigation measures. The net present value (NPV) of that $12,000,000 may be $10,000,000. The cost of mitigation measures for the identified building characteristic may then be identified at step 270 of FIG. 2. For example, the cost of retrofitting seismic mitigation measures to a building in the identified cohort of similar may be $2,000,000. This value may come from the actual cost observed in another similar building or may come from a cost estimator. The variance between the observed risk calculated at step 250 and the mitigation cost calculated at step 270 may be identified at step 280. In an instance when the observed risk for a given type of building comes from not retrofitting, seismic mitigation measures ($10,000,000 NPV) may be compared to the mitigation cost ($2,000,000 NPV) to yield a variance of $8,000,000 NPV. The variances for each building characteristic may be used by the building quality network computer to prioritize recommendations and or to weight the system value of each building characteristic in calculating the building quality index score. The building characteristics' weights may be provided as direct inputs from industry standards or may be extracted from data using machine learning techniques such as linear or polynomial regression, support vector machines, decision trees, or neural networks. After step 280, the flow chart of FIG. 2 may end at step 290.

Figure 3:
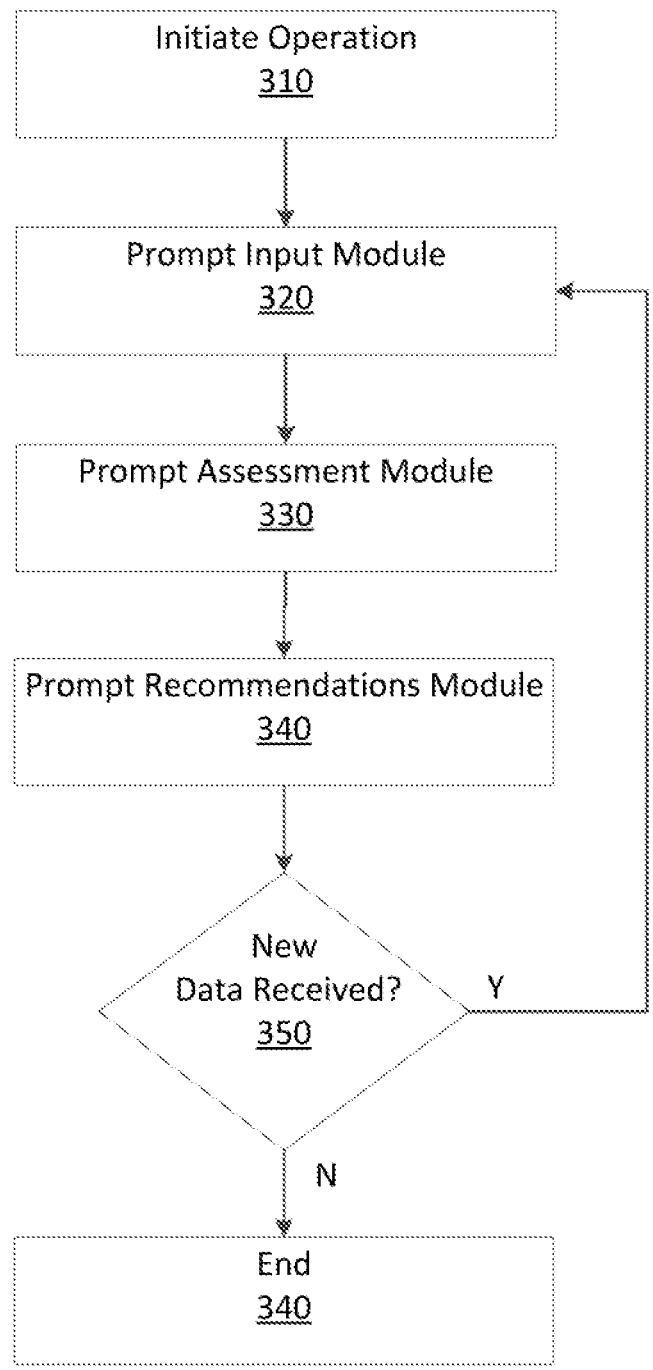
FIG. 3 illustrates steps that may be performed by instructions that may be associated with a building quality index (BQI) base software module.

FIG. 3 illustrates steps that may be performed by instructions that may be associated with a building quality index (BQI) base software module. The instructions of the BQI base software module may also be executed at the building quality network computer 105 of FIG. 1. The steps of FIG. 3 are initiated in step 310. The operation of the BQI base software module may have been initiated by a user accessing a user interface that may be located at a user device that communicates with a building quality network computer. Alternatively, a user may have initiated operation of this base software module by using a user interface at the building quality network computer. Next, the base software module may prompt an input software module at step 320 to allow the user or a third-party network computer 124 to input data related to one or more buildings into a building database. Next, at step 330 an assessment software module may be prompted to calculate a building quality index score for one or more buildings and scores based on implementing one or more potential recommendations. After step 330, a recommendations software module may be prompted at step 340 to allow a user to see the current building quality index score, recommended improvements, and the changes in building quality index score that would result from implementing one or more of the recommendations.

Determination step 350 may then identify whether new data has been or should be received. When yes, program flow may move back to step 320 where the input software module is prompted again to receive input. When determination step 350 identifies that there is no new data to be received, the flow chart of FIG. 3 may end at step 340.

Figure 4:
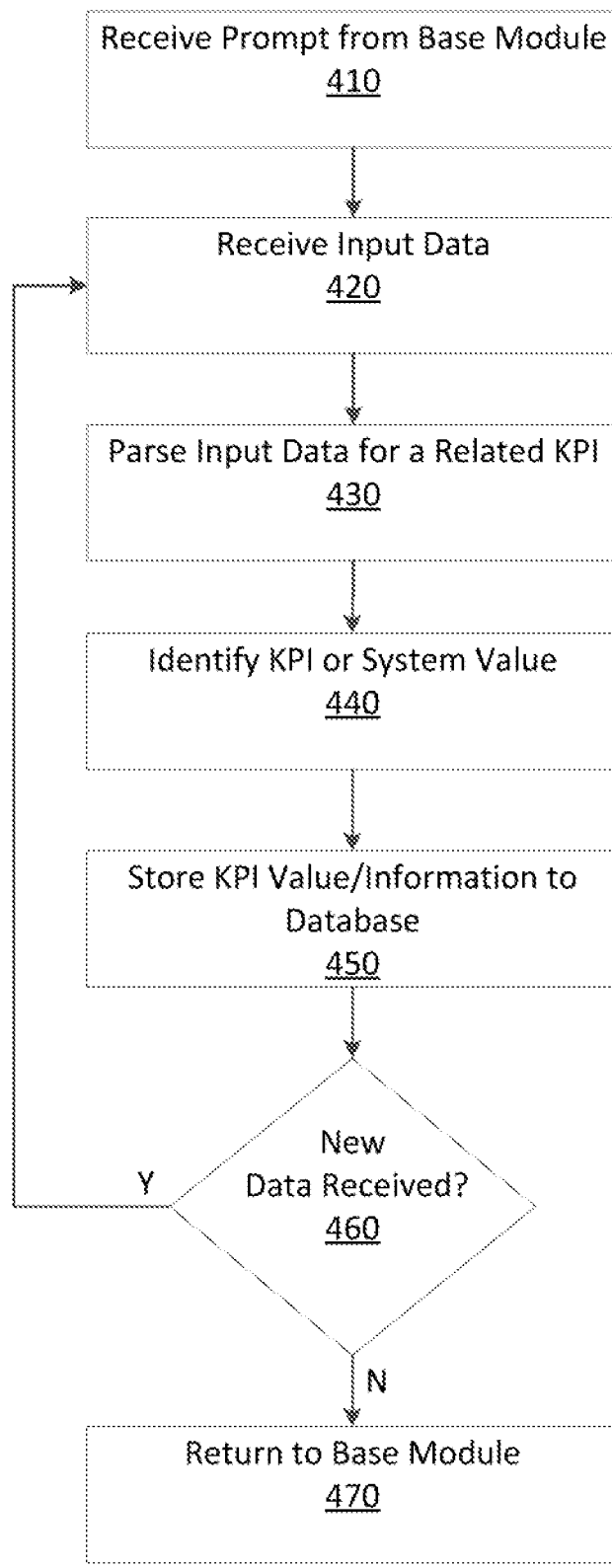
FIG. 4 illustrates steps that may be performed by instructions that may be associated with an input software module

FIG. 4 illustrates steps that may be performed by instructions that may be associated with an input software module. The instructions of the input software module may also be executed at the building quality network computer 105 of FIG. 1. FIG. 4 begins with step 410 where a prompt may be received from the BQI software module of FIG. 3. This prompt may identify that there is new data available about one or more characteristics of one or more buildings to be stored at the building database 110 of FIG. 1. Next, this new data may be received at step 420. The new data may be received in a variety of methods, a user may directly input data via a user interface, data may be received from a user device, or data may be received directly from a third-party network computer of a contractor or building permit office. Data may also be received automatically, such as by applying optical character recognition on a document related to one or more building characteristics. The data received in step 420 may then be parsed at step 430. This parsing may include filtering data associated with particular building characteristics and by collecting or identifying corresponding KPI and system values that correspond to the particular building characteristics. This step may identify a soil bearing pressure may be identified and a measure of this pressure in pounds per square foot may be extracted from a geotechnical report.

The system value for each identified building characteristic parsed at step 430 may be identified at step 440 of FIG. 4. For example, the building characteristic of fire rating of the building's exterior walls may have a system value range between zero and four. For this characteristic, the KPI or system values may be based on the performance under fire conditions and longevity of the building element. A four-hour wall provides at least 4 hours of time for occupants to exit the building before losing structural stability. A zero-hour wall provides no time for the occupants to exit the building. A four-hour wall is built of more durable construction and will also last longer. Here, a KPI assigned to the four-hour wall may be a value of four and the zero-hour wall may be assigned a value of zero. The KPI value for a building characteristic, such as exterior fire wall rating, may then be scaled to a unitless system value as shown in table 2 below. Table 2 illustrates a correspondence between KPI values in hours versus unitless system values of fire wall ratings.

TABLE 2

Fire Wall Ratings KPI vs System Value

| Building Characteristic Exterior Fire Wall Rating | KPI Value Hours | System Value (Unitless) |
|---|---|---|
| | 0 | 0 |
| | 1 | 2.5 |
| | 2 | 5 |
| | 3 | 7.5 |
| | 4 | 10 |

Some building characteristics may have negative KPI values. For example, for the building characteristic of seismic design, a calculation may consist of using the following data attributes. A building not located in a seismic zone may have a seismic system value of zero. A building located in a seismic zone that is designed to withstand a seismic event appropriate for the zone it is located in may have a seismic system value of zero. A building located in a seismic zone that is not designed to withstand a seismic event appropriate for the zone it is located in may have a system value of minus fifteen (−15). A building that recently experienced a seismic event and has not been evaluated for damage or repaired may have a seismic system value of −15. The zero system value for some attributes corresponds to a minimum level of performance that is typically required by building codes. Having this attribute does not necessarily make the building better than any peer buildings. However, it is of enough importance to the building's safety that a double-check may be necessary. A high negative system value for other attributes may correspond to the fact that if a seismic event were to occur or did occur, there is a substantial risk for deterioration of the building resulting in property loss to the owner. Zero system values may represent minimum standards, negative system values may represent potential for risk or loss, and positive system values may represent varying degrees of quality and longevity present in different construction technologies. The more positive system values may be correlated with increased quality and longevity.

After step 450, program flow may move to determination step 460 that may identify whether additional input data has been or should be receive. When there is more input data, program flow may move back to step 420, where the additional input data is received. When determination step 460 identifies that there is not any additional input data, program flow may move back to executing tasks of the BQI base module in step 470 of FIG. 4. Note that the input software module 130 may be used in a sequence with the assessment software module 135 and the recommendations software module 140 to input information, calculate a BQI score, and deliver recommendations to a user or user device. It should be obvious that the input software module 130 may run independently of the user involvement when data is collected over time.

Figure 5:
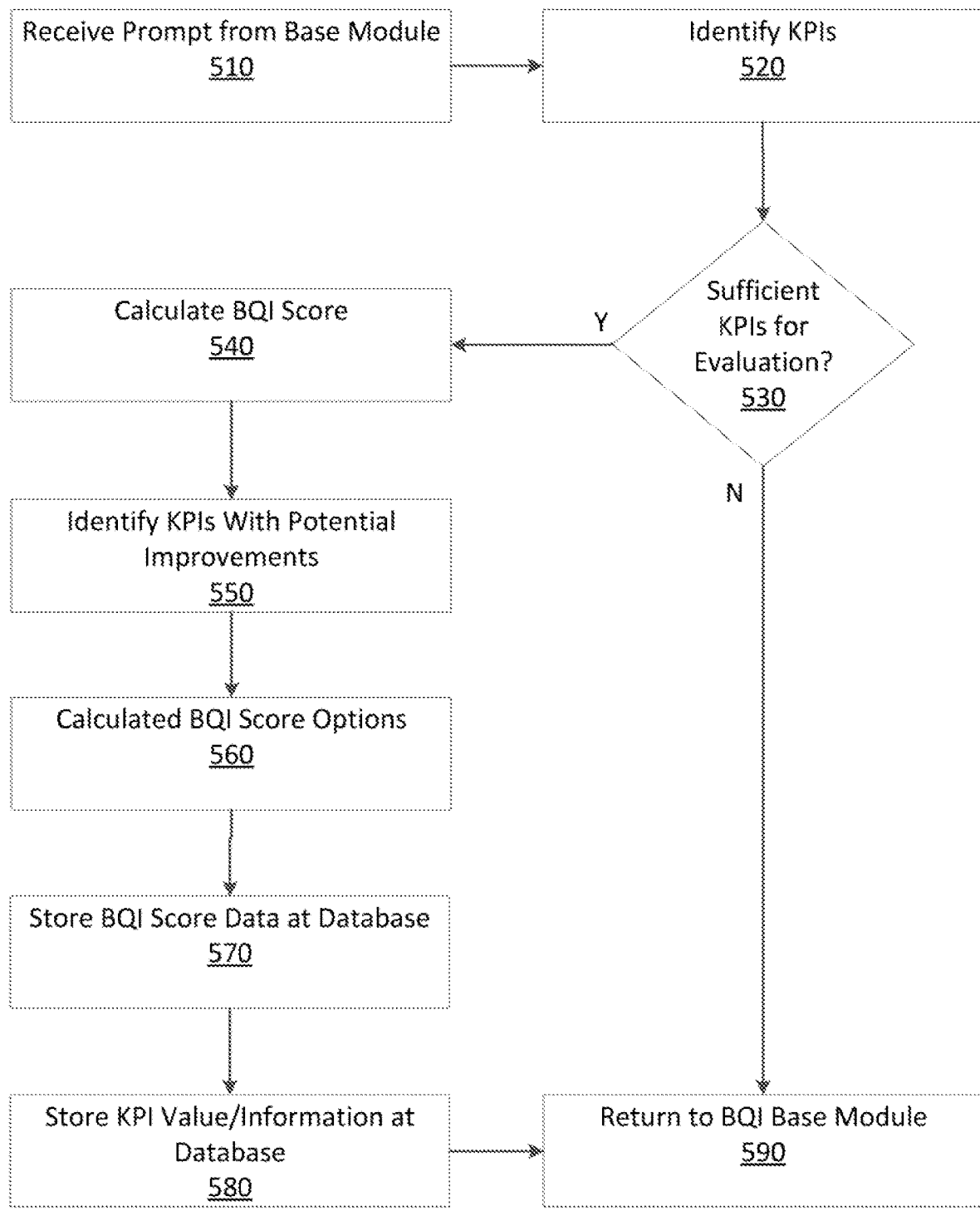
FIG. 5 illustrates steps that may be performed by instructions that may be associated with an assessment software module.

FIG. 5 illustrates steps that may be performed by instructions that may be associated with an assessment software module. The instructions of the assessment software module may also be executed at the building quality network computer 105 of FIG. 1. FIG. 5 begins with step 510 where a prompt is received from the BQI base module. This prompt may indicate that one or more building characteristic stored at the building database 110 of FIG. 1 has changed, and a new BQI score may need to be calculated based on this change to the building characteristic data. The KPIs associated with all known characteristics of the current building in the building database may be identified at step 520 and then determination step 530 may identify whether the current building has had enough building characteristics input into the building database to allow the building to be evaluated. System values for each KPI may also be identified before a BQI score is calculated. For example, if a building has only had information related to the roof materials and the fire rating of its exterior walls, this may not be enough data to create a BQI score. If there is insufficient data in the building database to evaluate building quality, the process proceeds to step 590 where instructions of the BQI base software module may once again be executed. When determination step 530 identifies that there is sufficient data in the building database to evaluate the building, a weight of the system value for each known building characteristic may be retrieved at step from the impact database 120 of FIG. 1. The BQI score for the building may then be calculated at step 540 of FIG. 5. The calculation of the BQI score could include identifying system values associated with each identified KPI, may include identifying weights to associate with each system value, and may include adding the different system values together. In certain instances, each system value may be equally weighted, and the value for each KPI may be summed together. The sum of all the highest possible system values for all the known characteristics of the building may translate to a BQI score of 1000, and the sum of all the lowest possible system values for all the known characteristics of the building may translate to a BQI score of 0. For example, a soil bearing pressure KPI value of −25, plus an exterior fire wall system value of 10, a seismic system value of −15, an electrical system KPI value of 0, and several other system values to yield a total of −123. If the lowest possible total of KPI values was −500, and the highest possible total of KPI values was +500, the building's total of 123 might translate to a BQI score of 377.

In another instance, a weight may be assigned to each KPI that may increase or decrease the impact of that system value on the overall BQI score. For example, the soil bearing pressure of the ground under a building may have a system value of +25 when the soil bearing pressure is greater than 8,000 pounds per square foot, a system value of 0 when the soil bearing pressure is between 5,000 and 8,000 pounds per square foot, and a system value of −25 when the soil bearing pressure is less than 5,000 pounds per square foot. A soil bearing pressure of fewer than 5,000 pounds per square foot may have serious negative ramifications on the quality and lifespan of a building. To account for the importance of good soil bearing pressure a weight may be assigned to the system value associated with the soil bearing pressure KPI. For example, one form of weighting may be to apply a multiplier of 3 to the −25 system value associated with soil bearing pressure lower than 5,000 pounds per square foot, to increase the impact on the overall BQI score of low soil bearing pressure, to more accurately reflect that building characteristic's impact on building quality. Weighting may be determined through a process such as linear regression. If this weight is applied to the system value summation method of the previous example, the building's system value total will decrease from −123 to −173, reflecting the three times multiplier applied to the soil bearing pressure system value. This change would lower the building's BQI score to 327.

The calculations of the impact software module may be used to weight the system values impact on the BQI score. For example, polynomial regression could be applied to each of the building characteristics system value and the observed risk data in order to identify which building characteristics are the most highly correlated with building quality, increased building lifespan, and or reduced risk. The system values of those building characteristics with higher correlation coefficients may have higher weights in calculating the BQI score.

Building characteristics that have system values that are associated with potential improvements may be identified at step 550. The improvements identified in step 550 may be associated with low, medium, and high optional cost factors. Next in step 560, BQI score options may be calculated, each of these different BQI score options may correspond to implementing some or all of a set of recommended improvements. The optional BQI scores identified in step 560 could allow a cost benefit analysis to be performed. This may allow an owner of a property decide whether to implement improvements associated with a higher cost, a medium cost, or a lower cost. Current BQI score and the optional BQI scores may be stored at a database at step 570 and KPI or system values and other information may be stored at step 580 of FIG. 5. Program flow may then move back to step 590 where instructions of the base software module are executed again.

Figure 6:
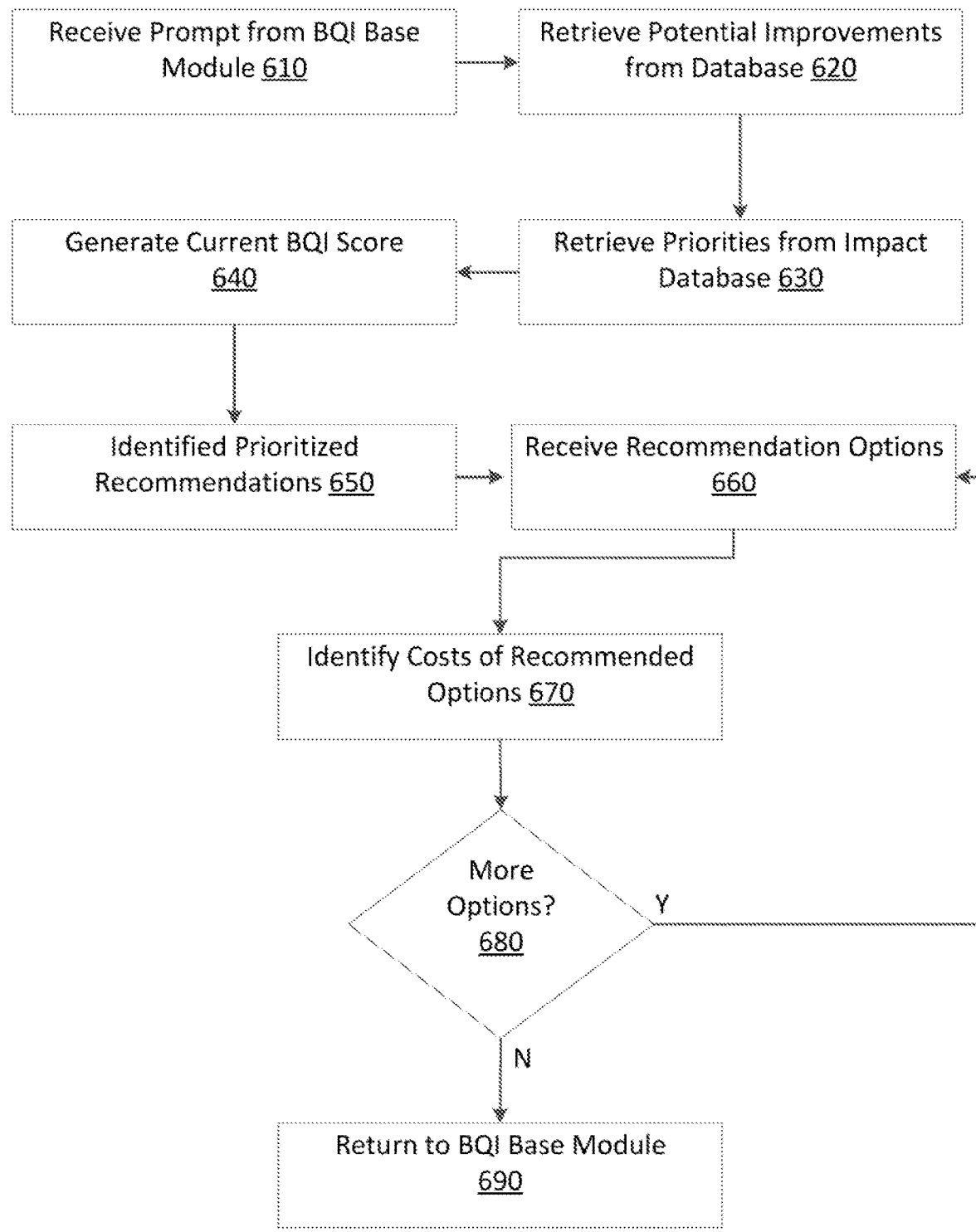
FIG. 6 illustrates steps that may be performed by instructions that may be associated with a recommendations software module.

FIG. 6 illustrates steps that may be performed by instructions that may be associated with a recommendations software module. The instructions of the recommendations software module may also be executed at the building quality network computer 105 of FIG. 1. FIG. begins with step 610 where a prompt is received from the BQI base module. The building characteristics that had system values that could be improved may be retrieved at step 620 from the building database 110 of FIG. 1. Here, a building located in a seismic zone that is not designed to withstand a seismic event appropriate for the zone it is located in may have a system value of −15. Retrofitting that building with seismic mitigation measures that bring it up to code may increase the building's current system value for the seismic building characteristic from −15 to 0. Some building characteristics may have system values that cannot be improved, such as soil bearing pressure, or the building being located in a flood zone.

Priority levels for each potential improvements identified may be retrieved from the impact database 120 of FIG. 1 in step 630 of FIG. 6. In one instance, the priority of each recommendation may be made based on the variance between a net present value (NPV) of risk mitigation and the NPV of not mitigating the risk. It should be obvious that an increase in building quality may be used interchangeably with decreasing a risk. For example, upgrading an HVAC system may reduce energy usage and maintenance requirements, improving the building's operating budget. An upgraded HVAC system may also improve the building's air quality, leading to an increase in the building's value. A current BQI score may then be calculated by the assessment software module at step 640. This score may be sent to a user device for display on a display of the user device. A prioritized list of the available recommendations may be identified at step 650. These recommendations may be sent to the user device and displayed on the display of the user device.

Next at step 660 a selection of one or more of the recommended options may be received from the user device. Each of the options may be associated with a different amount of work, different materials, and/or with different costs. Costs of implementing the different recommended options may be calculated and sent to the user device in step 670. Step 670 may also calculate BQI scores associated with each of the different recommended options. This information may then be displayed on the display of the user device. As discussed in respect to FIG. 5, each of the different costs for the recommended options identified in step 670 may correspond to low, medium, and high optional cost factors and different BQI scores.

Determination step 680 may then identify whether a user of the user device has provided additional options that need to be evaluated, when yes program flow may move back to step 660 where these recommendation options are received or prepared for processing. When determination step 680 identifies that there are no more options to receive or process, program flow may move to step 690 where instructions of the BQI base software module are executed again.

Figure 7:
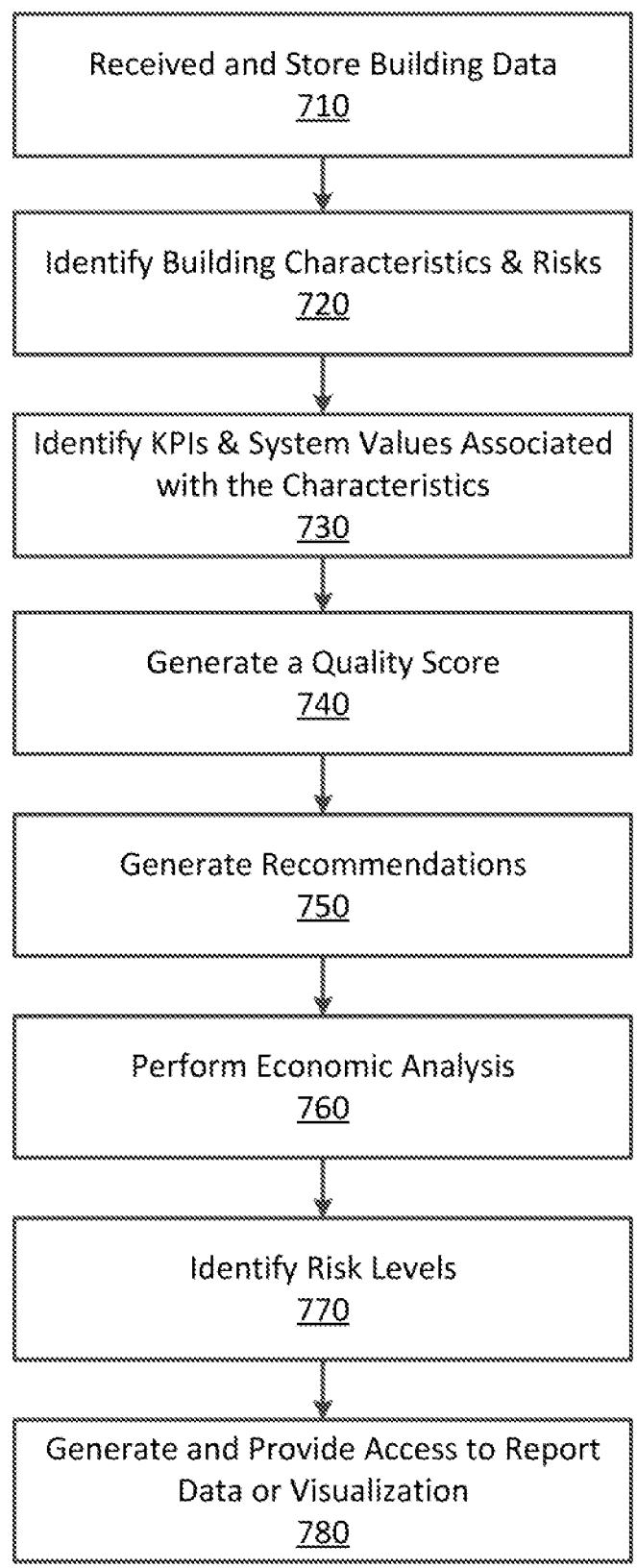
FIG. 7 illustrates a series of steps that may be performed when a building design is reviewed such that a building quality index can be assigned to the building design.

FIG. 7 illustrates a series of steps that may be performed when a building design is reviewed such that a building quality index can be assigned to the building design. The steps of FIG. 7 may be performed to identify ways a building may be improved before or after that building has been built. Because of this, person's owning or using a building may benefit from improving an existing building or from improving the design and fabrication of a new building.

FIG. 7 begins with step 710 where building data is received and stored. This building data may be received by a computer or server that is dedicated to assigning building quality index values to buildings before or after they have been built. This building data may include a building location, risks associated with that location (e.g. earthquakes, tornados, hurricanes, floods, wild fire, drought, or snow. This building data may also identify design features of the building and materials used to build the buildings. Here, design features and materials may identify a number of square feet, topologies of rooms included in the building, structural design features of the building, a type of exterior, an amount or type of insulation, an average number of sunny days at a location of the building, a type of heating or cooling, a type of roof/roofing material, number and types of windows, numbers and types of doors, whether the building will include industrial equipment, and power requirements for the building.

Data received in step 710 may be data from manufacturers, from test laboratories, or from other private or public sources. This data may be historical data related to the utility of materials or products that may be incorporated into the design of a building. Different types of materials, for example windows, may be associated with different values (i.e. utility values) associated with the effectivity, efficiency, the longevity, resiliency, durability, ecology, life cycle, and risks than other types of windows. The data received in step 710 may be stored in matrices that cross reference materials and products with benefits/detractors and with the aforementioned utility values.

Exemplary categories used to generate a quality index may include categories of people, planet, profit, and process. Each of these categories may be associated with a number of subcategories, where each category may include elements from any of the subcategories. Exemplary subcategories include initial costs, maintenance costs, projected energy use, energy self-sufficiency, environmental factors, location-based factors, and risk factors.

After building data has been received building characteristics and risks may be identified in step 720 of FIG. 1. Next in step 730, key performance indicators (KPIs) and system values associated with those KPIs may be identified. One or more KPIs may be associated with particular building characteristics. These different building characteristics may be associated with one or more different categories and subcategories. These categories may correspond respectively to a people category, a planet category, a profit category, and a process category. Subcategories that may be associated with the people category may include subcategories of view, average space dedicated for each person, comfort, proximity to a bathroom, and handicap accessibility. The planet category of FIG. 3 may be associated with subcategories of energy efficiency, energy self-sufficiency, a type of heating or cooling, measures of the building's ability to resist energy transfer (i.e. insulation "R" factor), and location-based risk factors. The profit category may be associated with subcategories of initial costs, maintenance costs, projected energy use costs, insulation R factor, average space dedicated for each person, and location risk factors. The process category may be associated with subcategories of maintenance costs, types of heating or cooling, handicap accessible, and location risk factors.

Each of the different subcategories discussed above may be assigned a value that may be incorporated into an algorithm used to calculate a score associated with the people category, the planet category, the profit category, and the process category. This algorithm may also calculate an overall quality score based on values associated with each category or subcategory. The indexing engine may use index values from each of a plurality of categories (e.g., people, planet, profit, and process) to generate a plurality of values corresponding to at least one of the categories and subcategories thereof. Each value may be determined by performance indicators, which may be assessed by users of the system, professionals, and the like. Each value may indicate a social score, resource score, fiscal score, and practice score which may be compiled to generate the total building quality index. Furthermore, each of these scores may have been calculated based on values associated with each of the categories or subcategories discussed above.

Note that some of the categories listed above include values from a same type of subcategory. Values assigned to a particular subcategory under a particular category may be different than a value assigned for that particular subcategory under a different category. For example, both people and profit categories above include an average space dedicated to each person as a subcategory. Here, the greater amount of space dedicated on average for each person working in a building may be associated with a larger average space value under the people category and this greater amount of space on average for each person may be associated with a lower average space value under the profit category. Such a difference accounts for the fact that more personal space is typically associated with greater personal satisfaction or higher employee morale, and that more personal space may also be associated with increased costs or lower profits.

Note that both the planet and profit categories include insulation R factor as a subcategory, in this instance, higher insulation R factors will typically be associated with higher planet values and with higher profit values. This is typically true because the better a buildings insulation is, the less energy that will be required to heat or cool the building, which helps conserve energy resources. Conserving energy resources is good for the planet because it reduces greenhouse gas emissions and is good for profit because it helps reduce costs. Even though insulation R factor may increase quality values of both the planet and profit categories, a value associated with insulation R factor under the planet category may not be the same as a value associated with insulation R factor under the profit category. As such, methods and systems consistent with the present disclosure may help building designers build more efficient and cost effective.

Values associated with each respective subcategory under each respective category may also change over time. For example, they may change when the cost of energy increases or they may change after new environmental laws are passed. For example, an increase in energy cost or the implementation of a carbon tax, could change values associated with specific building choices and related costs.

After KPIs and the system values are identified in step 730 a building quality index (BQI) score may be generated in step 740. One or more sets of recommendations may be identified in step 750. Next, in step 760 an economic analysis may be performed. This economic analysis may identify cost factors associated with each of the different sets of recommendations generated in step 750. As discussed in respect to FIGS. 5-6 each of these cost factors may be associated with different BQI scores and with different improvements that could be made to a building.

After step 770, risk levels associated with the recommendations may be identified in step 770. The risk levels identified in step 770 may correspond to costs for mitigating specific risks as discussed in respect to the data of table 1. Next in step 780 of FIG. 7, a report may be generated. This report could also be provided to the owner of a building in step 780. Data and visualizations included in the report could help an owner of the building identify how an older building could best be maintained or could be used to identify features that should be incorporated into a new building. This report data may identify various possible data-based recommendations. The report could also be based on historical or laboratory data that has been validated by either public or private entities.

As discussed above a building quality network computer may execute instructions of one or more software modules. Data may be collected from different third-party network computers and reports or other information may be provided to or received from user devices.

Each of the different subcategories discussed above may be assigned a value that may be incorporated into an algorithm used to calculate a score associated with the people category, the planet category, the profit category, and the process category. This algorithm may also calculate an overall quality score based on values associated with each category or subcategory. The indexing engine may use index values from each of a plurality of categories (e.g., people, planet, profit, and process) to generate a plurality of values corresponding to at least one of the categories and subcategories thereof. Each value may be determined by performance indicators, which may be assessed by users of the system, professionals, and the like. Each value may indicate a social score, resource score, fiscal score, and practice score which may be compiled to generate the total building quality index. Furthermore, each of these scores may have been calculated based on values associated with each of the categories or subcategories discussed above.

Different types of information that may be used to generate outputs may include sets of input data, sets of compiled or historical or laboratory utility data, an algorithm/filtering process, and outputs. The input data sets may include general building data economic building data, social & use benefit data, & best practices data. General building data may include information that identifies a size of a building, power requirements, window types & sizes, door types & sizes, and other factors. Economic building data may identify costs associated with purchasing and installing types of materials used in the building, maintenance costs, energy efficiency, energy self-sufficiency, and location-based risk. Social use & benefit data may identify how the building could affect a city where the building is located. This social and benefit data may identify the number of high-quality jobs that could be associated with the building. Different type of data used to generate outputs may be associated with building codes or desired building features (e.g. high insulation R factor) that could be incorporated into a building. The sets of compiled utility data include information that cross-references the input data with historical data. For example, a first type of window may be associated with higher longevity, resiliency, durability, green building, and life cycle metrics while being associated with a lower risk metric. These sets of data may also be used to identify that a second type of window has a relatively lower longevity, resiliency durability, green building, and life cycle metrics, while being associated with a higher risk. Best practices data may identify emerging activities done by some professionals that have an impact on improving or monitoring building quality but may not yet have been adopted en masse by all professionals of that trade. These activities are typically not required by any code, using them will increase the building's performance above code minimum, and they involve activities or technology used in maintaining or designing the top tier of buildings. For example, post-occupancy evaluation done by architects results in better building quality because user feedback is received, which may inform changes that need to be made to improve the building that an architect would not have otherwise known. Another example is the installation of devices providing continuous structural monitoring; an engineering best practice which may help to prevent deterioration of the primary structural frame by picking up issues before they become visible to the naked eye.

Data from input data sets discussed above may be combined with data associated with utility data when a filtering function or a calculation is performed according to algorithm/filtering process. This process may include identifying pieces of utility data that correspond to inputs received from a user. For example, based on inputs received, data that may be used to calculate a quality score. This score may be calculated from values of longevity, resiliency, durability, green building, life cycle, risk data, or other types of utility data metrics identified by a filtering process at a computer. This process may also identify how longevity data, resiliency data, durability data, green building data, life cycle data, and risk data when combined with the general building data, economic building data, social use & benefit data, and best practices data affect a buildings overall quality score. The combinations of the data from data sets and matrix data from utility data may also be used to identify recommendations associated with reducing risk, improving quality, and reducing costs. After a set of outputs has been identified for a given set of inputs, a user may evaluate these outputs and select which recommendations to act upon.

Figure 8:
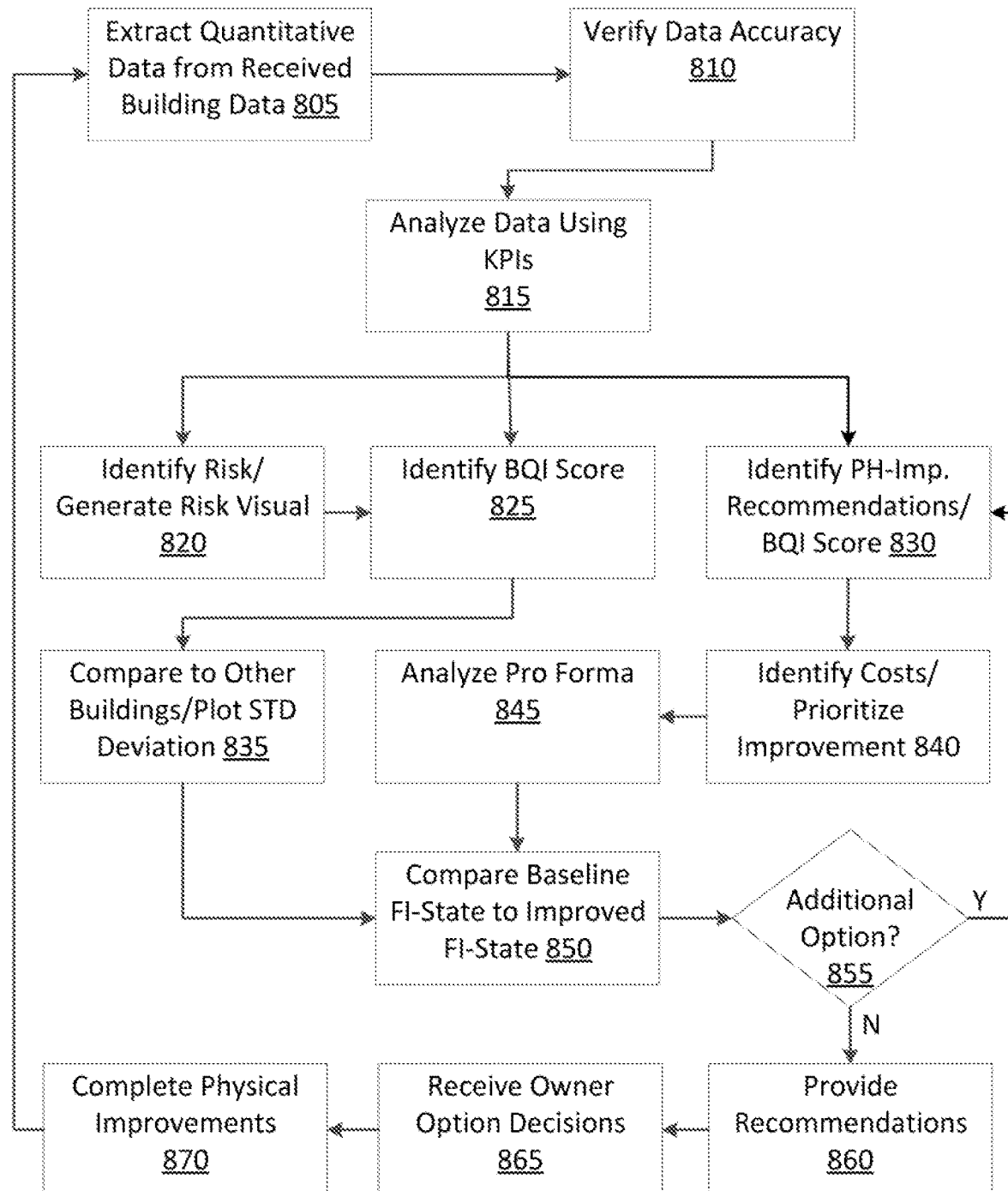
FIG. 8 illustrates a series of steps that may be performed when improvements to a building are identified.

FIG. 8 illustrates a series of steps that may be performed when improvements to a building are identified. Alternatively, the steps of FIG. 8 may be performed when a new building is designed and built. The steps of FIG. 8 may be performed iteratively over the course of the lifetime of the building to extend the life span of the building continuously over time. FIG. 8 begins with step 805 where quantitative data is extracted from received building input data. This received building input data may include building source documents that may identify characteristics of the building. These source documents may identify building materials, construction type, operational cost, natural disaster risk, safety equipment, energy efficiency, etc. The received input building data may also include data collected by sensors indicative of leaks, cracks, other building damage, or radiant heat loss, for example. The quantitative data extracted in step 805 may be include any of the information included in the source documents or any of the received sensor data. The extracted data may be data from which physical or financial improvements to the building may be identified. In certain instances, for example when a new building is being designed, received data may also include design requirements and building code information.

After step 805, the extracted quantitative data may be verified or validated in step 810 of FIG. 8 by a series of tests or cross-checks. For example, building materials may be examined, construction type data may be checked, operational costs may be reviewed, or additional received sensor data may be evaluated. The extracted data may then be analyzed in step 815. This analysis may be performed after key performance indicators (KPIs) have been identified and the analysis may be performed using the identified KPIs or associated KPI data or system values. The analysis performed in step 815 may compare the extracted quantitative data to KPIs, KPI data, KPI values, or system values. After step 815, program flow may move to any of steps 820, 825, or 830.

Step 820 may be a step where a risk is identified and where a visualization of risk-based information is generated. Step 820 may perform some or all of the steps illustrated in FIG. 2 that were previously discussed. In certain instances, program flow may move to step 825 from step 820. Step 825 is a step where a basic quality index (BQI) score may be generated/identified. As mentioned above, this BQI score may be calculated as discussed above in relation to step 540 of FIG. 5 using system or KPI values. After step 825, program flow may move to step 835 where the building is compared to other buildings. The comparison performed in step 835 may include comparing BQI scores, KPIs, KPI values, system values, or other information with a cohort of similar buildings or all commercial buildings that may be similar to or that may have similar attributes as the building being improved. Step 835 may also include plotting a standard deviation and storing of comparison data in a database. This comparison data may be provided to owners of the building as part of the method of FIG. 8. After step 835, program flow may move to step 850 that is discussed below.

When program flow moves to step 830 of FIG. 8 where a set of recommendations for physical improvements may be identified. These recommendations may be associated with one or more of a set of options as discussed in respect to FIGS. 5-6. Step 830 may also include identifying a BQI score associated with the identified recommendations. After step 830, costs associated with those physical improvement recommendations may be identified in step 840. Step 840 may also include prioritizing the physical improvement recommendations as discussed above. Next, in step 845 Pro Forma metrics may be analyzed. This may include calculating financial results using sets of projections or presumptions. This Pro Forma analysis may include highlighting items for potential investors or may include information that helps owners of the building to make decisions regarding implementing a specific set of physical improvements such that future financial projections regarding the building may be identified.

After the Pro Forma analysis is performed in step 845, a baseline of financial state (FI-State) information may be compared to improved financial (FI-State) information. This improved FI-State information may include a set of financial improvements that could be performed to generate revenue to help pay for (fund) a set of identified physical improvements to a building. Recommendations associated with financial improvements may include recommending one or more of that a loan be acquired, raising rents, increasing times that other improvements are put off (hold times), or could identify other ways that the building could be used to raise funds (e.g. by holding events or conferences at the building).

This comparison step 850 may include forecasting that rents in a building could be increased by a specific amount based on a particular set of physical building improvements being implemented. Alternatively, or additionally, this comparison step may identify that certain physical improvements should increase the life span of the building or reduce operating costs of the building by certain amounts. Next determination step 855 may identify whether additional options for improving the building are available to evaluate, when yes, program flow may move back to step 830 of FIG. 8 discussed above.

When determination step 855 identifies that there is not any additional information to evaluate, program flow may move to step 860 where recommendations are provided for evaluation by owners of a building. This step may include displaying different sets of optional physical improvements and related financial improvement data on a display or it may include sending data to a user device. Next, owner decision data may be received in step 865 that may identify one or more identified sets of physical improvements. The decision data may be received via a user interface or from a user device. Step 865 may include storing the received decision data that may be used for future evaluations. After step 865, the sets of physical improvements selected by the building owners may be initiated or completed in step 870 and program flow may move back to step 805 where the process of FIG. 8 may begin again.

Figure 9:
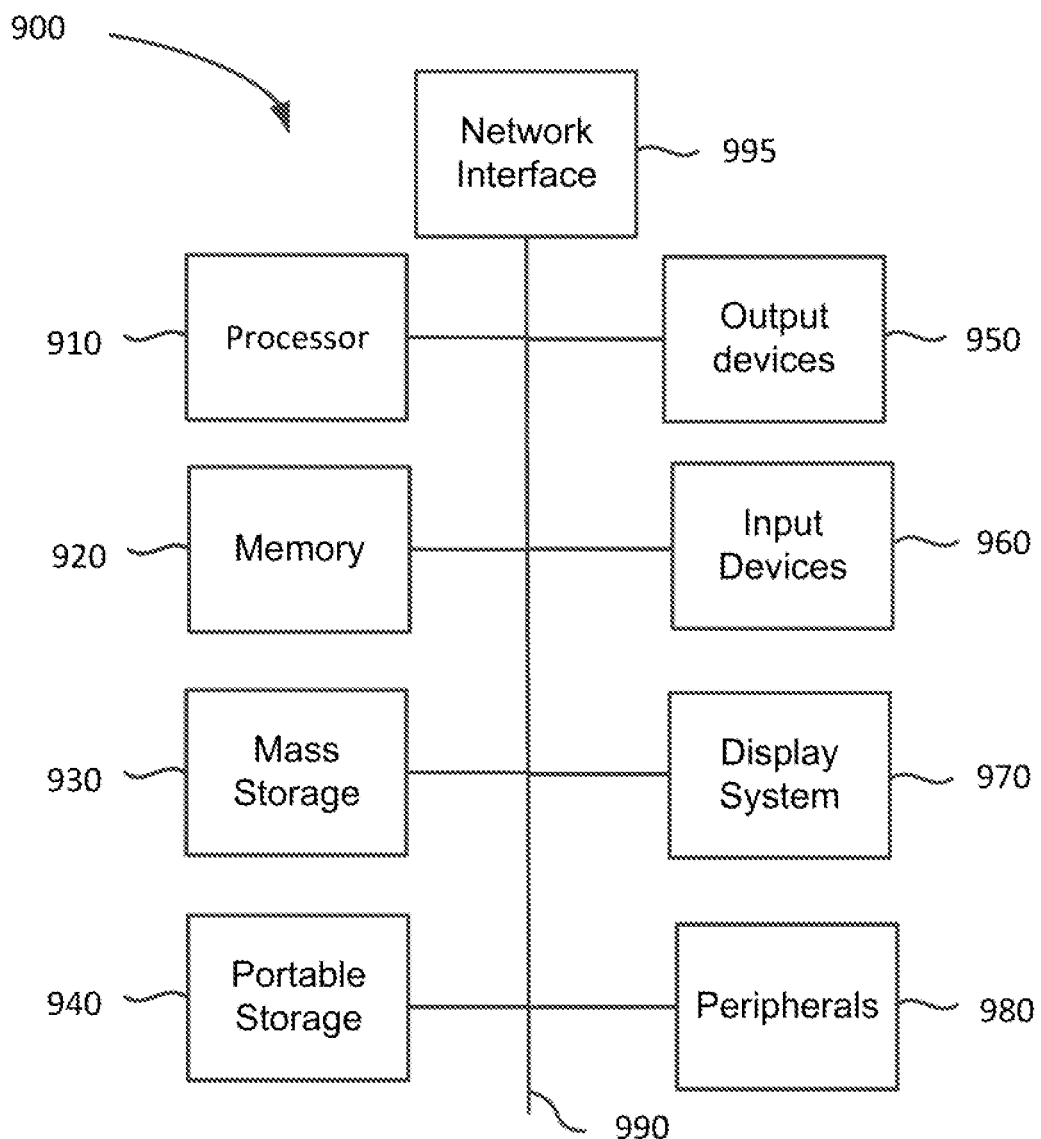
FIG. 9 illustrates a computing system that may be used to implement an embodiment of the present invention.

FIG. 9 illustrates a computing system that may be used to implement an embodiment of the present invention. The computing system 900 of FIG. 9 includes one or more processors 910 and main memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, peripheral devices 980, and network interface 995.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a FLASH memory, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD), a plasma display, an organic light-emitting diode (OLED) display, an electronic ink display, a projector-based display, a holographic display, or another suitable display device. Display system 970 receives textual and graphical information and processes the information for output to the display device. The display system 970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 980 may include any type of computer support device to add additional functionality to the computer system. For example, peripheral device(s) 980 may include a modem or a router.

Network interface 995 may include any form of computer interface of a computer, whether that be a wired network or a wireless interface. As such, network interface 995 may be an Ethernet network interface, a BlueTooth™ wireless interface, an 802.11 interface, or a cellular phone interface.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 900 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge. A non-transitory computer-readable storage medium as used herein is not to be construed as being transitory signals per say such as radio waves, or other freely propagating electromagnetic waves, electromagnetic waves propagating through a wave guide or other transmission medium, or electrical signals transmitted through a wire.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for improving a building, the method comprising:
    receiving input data associated with the building;
    extracting quantitative data from the received input data;
    performing an analysis that compares the quantitative data with key performance indicator (KPI) data, the analysis including a financial analysis associated with increasing lifespan of the building;
identifying results based on the analysis that compares the quantitative data with the KPI data, the results including a recommendation of a physical improvement that improves the lifespan of the building;
identifying costs associated with implementing the physical building improvement recommendation; and
identifying that the costs associated with implementing the physical building improvement is offset by savings over the lifespan of the building based on the financial analysis, wherein the physical building improvement is performed based on the costs being associated with the implementation of the physical building improvement being offset over the lifespan and with a reduced total cost of ownership (TCO) of the building.

2. The method of claim 1, further comprising identifying a recommendation of a financial improvement that once performed facilitates initiation of the implementation of the physical building improvement, wherein the physical building improvement is also performed based on implementation of the financial improvement to fund at least a portion of the costs.

3. The method of claim 2, further comprising identifying that the financial improvement recommendation includes acquiring a loan to fund the at least portion of the costs.

4. The method of claim 2, further comprising identifying that the financial improvement should include increasing rent to fund at least the portion of the costs.

5. The method of claim 2, further comprising identifying that the financial improvement includes revenue from a group of revenue sources that could be used to fund the at least portion of the costs.

6. The method of claim 2, further comprising performing the financial analysis to identify the financial improvement recommendation.

7. The method of claim 6, further comprising generating output based on performance of the financial analysis, the output identifying a period of time over which the costs are spread out based on the implementation of the financial improvement.

8. The method of claim 6, wherein the financial analysis includes the steps of:
identifying a first total cost of ownership (TCO) associated with the building before implementation of the physical building improvement;
identifying a second TCO associated with the building after implementation of the physical building improvement; and
identifying the reduced TCO by comparing the first TCO to the second TCO, wherein the financial recommendation is identified based on the reduced TCO.

9. The method of claim 1, further comprising generating a quality score associated with the building to include in the results.

10. The method of claim 9, further comprising identifying one or more values associated with the generation of the quality score.

11. The method of claim 10, further comprising identifying a weighting factor to associate with at least one value of the one or more values.

12. The method of claim 11, wherein the score is generated based at least in part on the weighting factor associated with the at least one value.

13. The method of claim 10, further comprising:
identifying that the input data is associated with a plurality of data categories; and
associating the one or more values with respective portions of the input data and with the plurality of data categories.

14. The method of claim 13, further comprising generating the quality score based on the respective portions of the input data being associated with one or more respective building quality classifications.

15. The method of claim 1, further comprising identifying a risk level associated with the building to include with the results.

16. The method of claim 15, generating a score based on a risk value associated with the risk level.

17. The method of claim 15, further comprising:
identifying a building characteristic; and
identifying a KPI associated with the building characteristic that corresponds to the KPI data.

18. The method of claim 1, further comprising:
identifying a risk variance associated with a building risk by comparing an observed risk cost to a risk mitigation cost; and
prioritizing the building risk based on the identified variance.

19. The method of claim 1, further comprising:
identifying at least one building that has shares at least one characteristic of one or more building characteristics; and
identifying a repair cost for repairing a feature of the at least one building based on the feature being associated with the at least one characteristic of the one or more characteristics.

20. A non-transitory computer-readable storage medium having embodied thereon a program executable by a processor for implementing a method for improving a building, the method comprising:
receiving input data associated with the building;
extracting quantitative data from the received input data;
performing an analysis that compares the quantitative data with key performance indicator (KPI) data, the analysis including a financial analysis associated with increasing lifespan of the building;
identifying results based on the analysis that compares the quantitative data with the KPI data, the results including a recommendation of a physical improvement that improves the lifespan of the building;
identifying costs associated with implementing the physical building improvement recommendation; and
identifying that the costs associated with implementing the physical building improvement is offset by savings over the lifespan of the building based on the financial analysis, wherein the physical building improvement is performed based on the costs being associated with the implementation of the physical building improvement being offset over the lifespan and with a reduced total cost of ownership (TCO) of the building.

21. The non-transitory computer-readable storage medium of claim 20, the program further executable to identify a recommendation of a financial improvement that once performed facilitates initiation of the implementation of the physical building improvement, wherein the physical building improvement is also performed based on implementation of the financial improvement to fund at least a portion of the costs.

* * * * *